United States Patent
Laurent et al.

(10) Patent No.: US 9,189,132 B2
(45) Date of Patent: Nov. 17, 2015

(54) DYNAMIC CONFIGURABLE MENU USING SELF-DESCRIBING APPLICATIONS

(71) Applicant: Oracle International Corporation, Redwood Shores, CA (US)

(72) Inventors: Nicole Laurent, Lakewood, CO (US); Mark A. Johnson, Denver, CO (US)

(73) Assignee: Oracle International Corporation, Redwood Shores, CA (US)

( * ) Notice: Subject to any disclaimer, the term of this patent is extended or adjusted under 35 U.S.C. 154(b) by 289 days.

(21) Appl. No.: 13/829,102

(22) Filed: Mar. 14, 2013

(65) Prior Publication Data

US 2014/0096024 A1 Apr. 3, 2014

Related U.S. Application Data

(60) Provisional application No. 61/707,924, filed on Sep. 29, 2012.

(51) Int. Cl.
| | |
|---|---|
| *G06F 3/0482* | (2013.01) |
| *G06F 21/31* | (2013.01) |
| *G06F 21/12* | (2013.01) |
| *G06F 21/62* | (2013.01) |
| *G06F 9/44* | (2006.01) |

(52) U.S. Cl.
CPC .............. *G06F 3/0482* (2013.01); *G06F 8/38* (2013.01); *G06F 21/128* (2013.01); *G06F 21/31* (2013.01); *G06F 21/629* (2013.01); *G06F 2221/2113* (2013.01)

(58) Field of Classification Search
None
See application file for complete search history.

(56) References Cited

U.S. PATENT DOCUMENTS

| | | | | |
|---|---|---|---|---|
| 2004/0075675 | A1* | 4/2004 | Raivisto et al. | 345/700 |
| 2004/0117439 | A1* | 6/2004 | Levett et al. | 709/203 |
| 2006/0250578 | A1* | 11/2006 | Pohl et al. | 351/210 |
| 2008/0065974 | A1* | 3/2008 | Campbell | 715/200 |
| 2011/0207433 | A1* | 8/2011 | Miyamoto | 455/411 |
| 2014/0026057 | A1* | 1/2014 | Kimpton et al. | 715/733 |

* cited by examiner

*Primary Examiner* — Tadeese Hailu
(74) *Attorney, Agent, or Firm* — Trellis IP Law Group, PC

(57) ABSTRACT

A menu application provides an integrated interface for launching multiple mobile applications from a dynamically configurable menu. Each of the mobile applications is associated with a servlet that provides the application's menu data to the menu application. The servlet may query design-time data and application run-time data to generate the menu data for the application. Additionally, the set of applications included by the menu application in a menu list may be based on a user authorization level, such that the menu list only includes applications that the user is authorized to access.

18 Claims, 4 Drawing Sheets

DYNAMIC CONFIGURABLE MENU USING SELF-DESCRIBING APPLICATIONS

CROSS REFERENCES TO RELATED APPLICATIONS

This application claims priority from U.S. Provisional Patent Application Ser. No. 61/707,924, entitled DYNAMIC CONFIGURABLE MENU USING SELF-DESCRIBING APPLICATIONS, filed on Sep. 29, 2012, which is hereby incorporated by reference as if set forth in full in this application for all purposes.

BACKGROUND

The field of the invention is software applications, and specifically systems and methods for organizing and accessing multiple applications through a common user interface.

Before the present invention, it was customary for mobile enterprise applications to be deployed individually. Each application could be accessed and launched through its own unified resource locator (URL) or other type of address. However, there were no good techniques for launching multiple mobile enterprise applications from a single place; providing simple navigation and a consistent user interface suited for the device from which the applications would be launched; and adapting menu applications to user preferences, such as locale.

One prior technique was to program a menu application; however, this approach requires that the application be reprogrammed if the mix of available mobile applications changed. This procedure is inefficient from the point of view of the provider of the applications; cannot easily accommodate user-generated applications or status information from running applications; and requires different menu applications to permit users with different authorization levels to use some of the mobile applications but not others.

SUMMARY

Embodiments of the invention include a menu application that provides an integrated interface with consistent and simplified navigation for launching multiple mobile applications from a dynamically configurable menu. In embodiments of the invention, each of the mobile applications provides its own description and launch information for its menu entry to the menu application.

In an embodiment, a method for generating an integrated interface for launching mobile applications comprises obtaining a list of mobile applications. The mobile applications being located on one or more application servers. The method selects one of the mobile applications on the list of mobile applications and accesses a servlet associated with the selected mobile application to request menu data associated with the selected mobile application. In a further embodiment, the servlet is adapted to query the selected mobile application for menu data.

After the method obtains menu data of the selected mobile application from the servlet, the method generates a menu item with the menu data and adds the menu item to a menu list. These operations may be repeated for each of the listed mobile applications and then the completed menu list is presented to a user.

In yet a further embodiment, the list of mobile applications may be based on a user authorization level, such that the menu list only includes applications that the user is authorized to access.

A further understanding of the nature and the advantages of particular embodiments disclosed herein may be realized by reference of the remaining portions of the specification and the attached drawings.

DETAILED DESCRIPTION OF EMBODIMENTS

In this document, a mobile application or mobile enterprise application shall mean any application that is made available from a network-accessible location to one or more users of mobile and/or non-mobile devices, whether the environment is for enterprise software or other software.

Embodiments of the invention include a menu application that provides an integrated interface with consistent and simplified navigation for launching multiple mobile applications from a dynamically configurable menu. In embodiments of the invention, each of the mobile applications provides its own description and launch information for its menu entry to the menu application.

Figure 1:
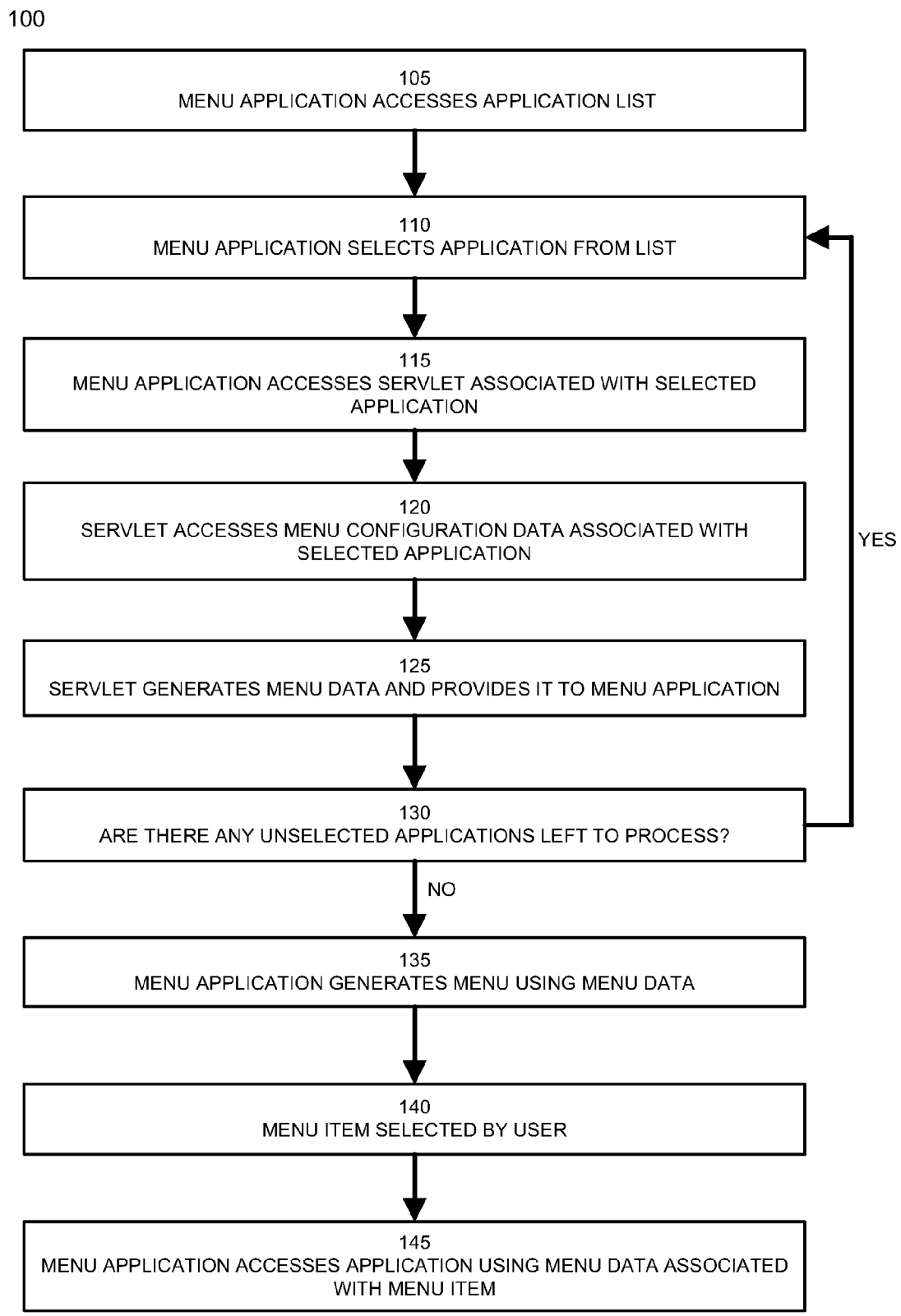
FIG. 1 illustrates a method for dynamically generating a configurable menu according to an embodiment of the invention.

FIG. 1 illustrates a method 100 for dynamically generating a configurable menu according to an embodiment of the invention. User devices displaying or otherwise presenting the integrated interface may be mobile, such as a tablet computer, a smartphone, a wearable device, a mobile phone, a notebook computer, a PDA, etc., or non-mobile such as a desktop computer, terminal, etc. In this document they are referred to as devices, whether mobile or not. A common characteristic of devices is that they have an actuator for presenting a menu (for instance a display and/or a loudspeaker), and one or more sensors (for instance a touchscreen or a microphone) and/or buttons for activating items on such a menu. In an embodiment of method 100, the menu is generated by a menu application. The menu application may be included in a centralized server that also includes the mobile applications.

Method 100 begins with step 105 accessing a list of mobile applications (the application list). In an embodiment of step 105, a menu application accesses a list of mobile applications. Each mobile application may perform different functions. Examples of such functions in an enterprise environment include Sales Inquiries, Expense Management, Requisition Approval, Purchase Order Approval, etc. The list of mobile applications could be kept in many formats. For instance, it could be a single text file, where mobile applications are separated by non-alphanumeric separators such as commas, newlines, etc., or the list could be kept in a configuration file along with options and properties, where the list might be a single line item, or another data structure. For example, a Java language configuration file may include the attribute:

DDEPLOYED_APPS=PurchaseOrderApproval,MobileSales,ExpenseManagement

Step 110 selects a mobile application (that hasn't been selected yet) from the application list. Continuing with the above example, the menu application would first pick PurchaseOrderApproval. However, if that would have already been selected before, it picks the next available, MobileSales, and so on.

In a particular embodiment, a system may perform authentication of a user only once per session (prior to step 110), and based on the user's authorization within an enterprise environment, some applications may be kept on a copy of the application list specific to this user, whereas other applications may be removed, so as to guard the appropriate level of application security. Alternatively, the application list could be kept whole and, if a user is not authorized to use a certain application from the application list, that application may be ignored and the next one selected.

Step 115 accesses a servlet that is associated with the selected mobile application. In an embodiment, the mobile applications provide their own descriptions and launch information in the form of a servlet, which they expose to the menu application. One servlet instance may be used for each mobile application, based on servlet class code shared between some or all mobile applications, where the servlet instance's properties are stored in a file or other data structure associated with each application. Each application's servlet properties may be in any type of data format, such as an XML format. In this embodiment, the accessed servlet is the instance associated with the selected mobile application.

In step 120 the servlet queries its mobile application for details to present on the menu. These details may include the URL or launch address of the mobile application. Embodiments could further include application properties such as one or more icons, a translated name, descriptions, tooltips, and/or other information such as animations, layout, color or shape information, audio, etc. Additional information associated with the menu can include a translation bundle that allows each individual mobile application to house its own translations, and an application identifier (ID) which can be used to determine if a user is authorized to run a mobile application.

In an embodiment, the servlet reads design-time configuration data from a file associated with the mobile application. Such a file may be a configuration file in XML format. Additionally, the servlet may obtain run-time information and status data directly from the application itself. Such run-time information could include whether the user is logged on to the application, or whether the application has messages or alerts for the user, etc. For example, the translated name of the application may be determined from a translation bundle within the application. The translation bundle within each application contains the translated name, and when the servlet is called within the application it runs logic that gets the translated name from the bundle and responds with a configuration file including the translated name.

In step 125, the servlet generates menu data and provides it to the menu application. In an embodiment, the servlet may combine design-time information with run-time information, where generally run-time information, which is dynamic, takes precedence over design-time information, which is static. The menu application provides its own formatting, suited for the device on which the data is presented, and in line with the user's preferences. The menu application generates a menu item from the available data, and adds the menu item to a menu list. For example, design time information may include the ID of the application and the icon (e.g. image file) to represent the application on the menu. The menu application dynamically determines which applications to display to a user based on which ones they are authorized to use (for example based on application id).

Some embodiments allow each mobile application to expose its own multiple icons, text styles, controls and other aspects of graphics or visual design to the menu application for use in the integrated interface. The integrated interface can present the graphics in a uniform, organized manner, suitable for the device on which the menu is displayed. Selection or translation of text in the applications can be handled by the menu application so that, for example, all text in the integrated interface is in the same desired language.

Method 100 repeats steps 110 through 130 until there are no more mobile applications left to process.

In step 135, the menu application generates a menu for presentation to the user, using the menu list from step 125. Since all pertinent data (URL, etc.) is accessed from each individual mobile application at a time of rendering the menu, the menu application is able to display the current characteristics of each mobile application that is exposed to it. The system can display any number of mobile applications without having to change the code of the menu application. In embodiments, each mobile application exposes its own data for the menu system via a configuration file and a servlet.

In step 140, a user may activate a menu item using any of the available methods for the device to generate an activation event. This can be tapping a displayed menu item, or navigating to it and pressing a button, or by saying it, or through any other user input technique and/or user input device known in the art. The menu item activation event triggers step 145.

In step 145, the menu application launches the user selected mobile application using the URL or launch address associated with the menu item. At this point, in some embodiments the device's display may become dominated by the mobile application, and/or the menu could be redrawn, reconfigured, or hidden.

Figure 2:
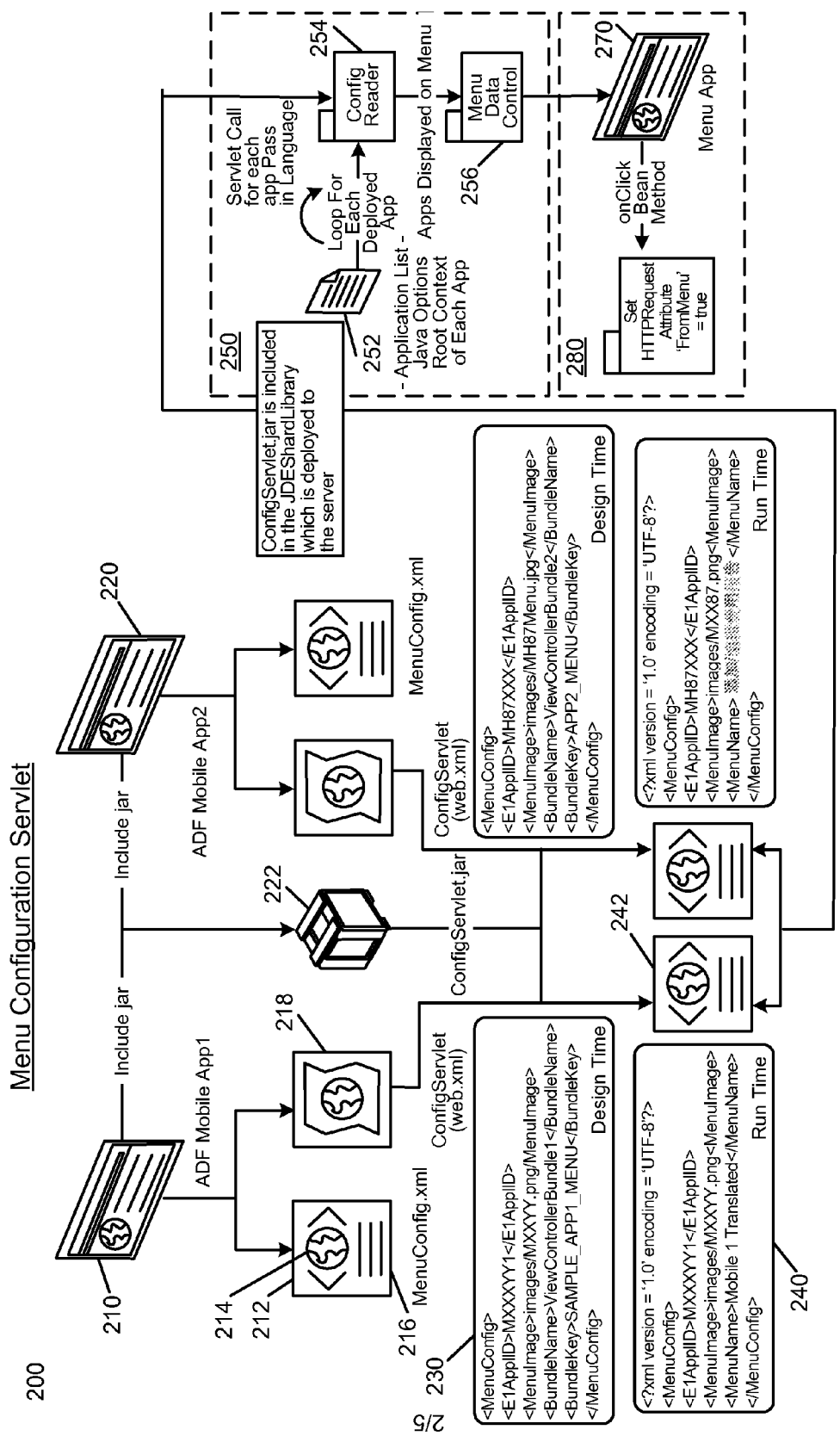
FIG. 2 illustrates an example system architecture of a dynamic configurable menu system according to an embodiment of the invention.

FIG. 2 illustrates an example system architecture 200 of a dynamic configurable menu system according to an embodiment of the invention. In FIG. 2, mobile applications such as 210 and 220 are available for selection and activation by a device user. A human administrator or programmer of each application determines the data needed to generate a menu entry representing the mobile application. For example, menu entry 212 corresponds to application 210. Menu entry 212 can include a URL, an icon 214, text 216, and/or other information. In some embodiments, users may create their own applications to be used in the same environment, and following the same method(s), their applications can easily be displayed on the menu, too.

In an embodiment, the menu entry data is formatted into a design-time configuration such as design-time menu description 230 corresponding to design-time menu item 212 and application 210. However, the generated run-time menu item 242, based on run-time description 240 of application 210, may show different aspects, such as translated text, a modified icon, etc.

Each mobile application to be presented on the menu exposes an instantiation of a servlet, such as application 210 exposing servlet 218 (based on class 222), to query and generate the information that the menu needs to display. In an embodiment, a library shared by all mobile applications contains the servlet class code 222. Basic operations performed by or at the mobile application's processing system include:

(1) Importing a shared library;
(2) Creating a configuration file with application specific details; and
(3) Exposing information for an instantiation of the servlet in a file.

More than one mobile application may reside on the same server. It should be apparent that the discussion herein relating to application 210 and its menu entry is analogous for one or more additional applications, such as application 220.

Server 250 deploying the menu contains a list of mobile applications and their respective configurations so that the menu application knows what to display and how (e.g. using Java options). Server 250 can serve web page 270 or another object that causes a display of the integrated menu on a user device. The server parses list 252 of mobile applications and accesses the servlet of each application listed, getting the URL, an icon, and a translated name for each application to be presented in the integrated interface. The application list includes specific strings. These strings are the root context of each of the deployed mobile applications that the administrator allows to display on the menu, given the user's authorization level.

The customer server uses configuration reader 254 to request a run-time menu configuration from each application to be included in the integrated interface, such as run-time menu configuration 240 that defines menu item 242 corresponding to application 210. Menu data control 256 generates a dynamic page with all menu items on the menu list, for display in a browser application in user device 280.

The menu data control will query a database, using a web service, and user credentials. Based on the web service response and each mobile application's ID (exposed by each mobile application) the menu data control determines which mobile applications a signed-on user is authorized to run. The menu data control then controls which mobile applications display in the menu based on the authorization settings.

Figure 3:
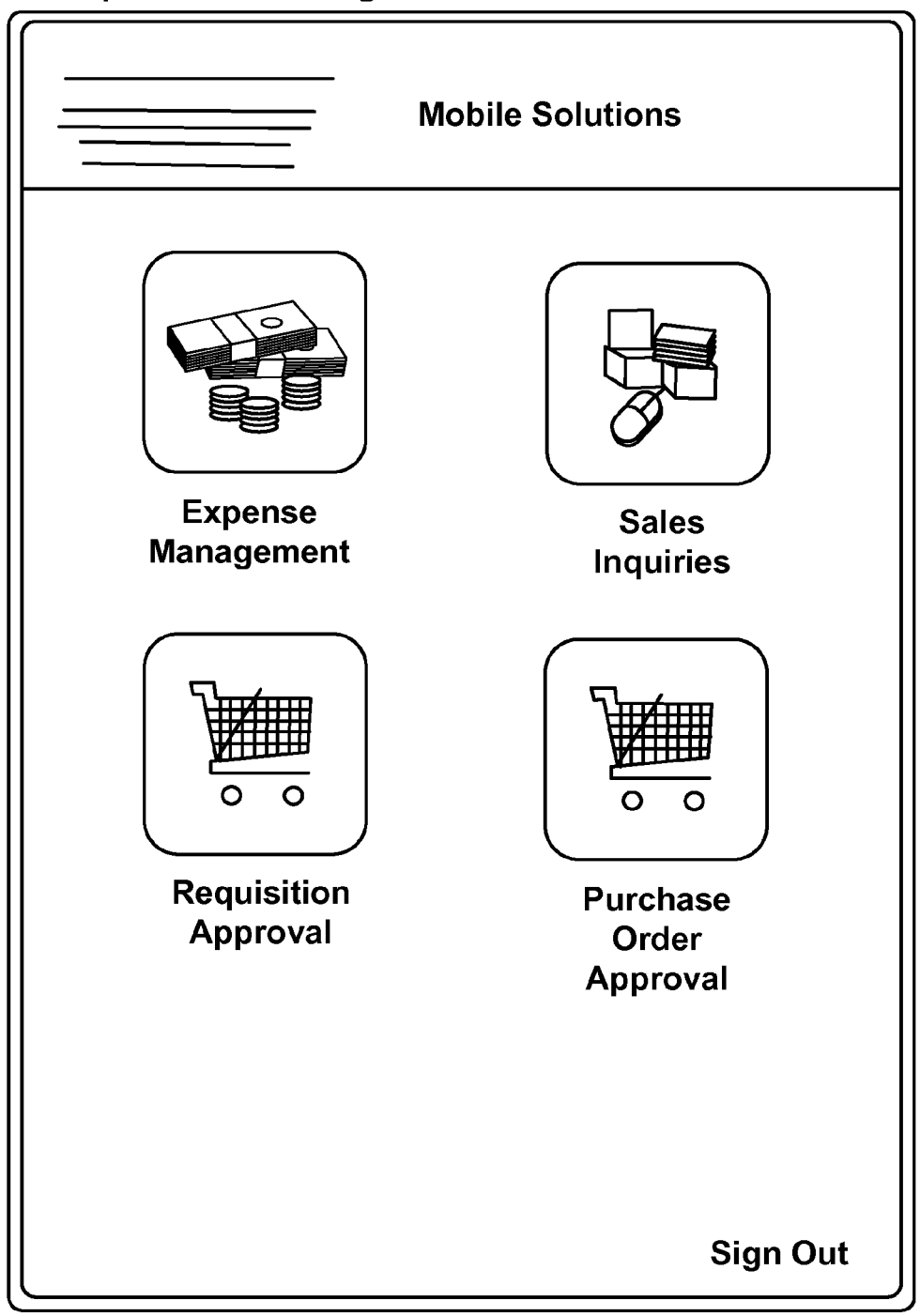
FIG. 3 illustrates an example integrated interface showing menu items for launching mobile applications from the display of a mobile device implemented with an embodiment of the invention.

FIG. 3 illustrates an example integrated interface 300 showing menu items for launching mobile applications from the display of a mobile device implemented with an embodiment of the invention. Each menu entry is represented by a menu item comprising a button that includes an icon, along with descriptive text or a name below the button. By tapping on or otherwise activating the button, the corresponding URL is invoked to launch the application associated with the menu item.

Embodiments can provide the advantages such as a single source of code, with minimum duplication for multiple applications. Maintenance can be easier and more efficient. The icons and names of the applications do not need to be copied into the menu application and can be changed without regard to any existing common menu scheme. The menu accounts for future applications being displayed on the menu, without any changes to the menu code itself.

Embodiments can enhance the usability of the existing and any future mobile applications, by allowing access to the menu application itself, from a single URL. This way the menu application does not need to run on a mobile device, but can run on a centralized server instead. The URL provides indirect access to all other desired deployed applications. This provides easy deployment of the system, since the integrated interface can be displayed in a web browser, which is already available in most mobile (and non-mobile) devices.

Advantages of the system include:
1) A menu that is coded only once and can display an unlimited number of mobile applications based solely on configuration.
2) A menu that is agnostic to the mobile applications being displayed, where icons, names or other aspects of menu items can change without the menu itself changing.
3) A menu that displays translated names of the mobile applications based on the user's language preference.
4) Individual mobile applications that have very minor configurations (coding time) to conform to the menu standard, to be displayed on the menu.
5) A menu with the look and feel as other applications used in the same device or environment.
6) A menu where authentication happens once and mobile application security authorization can drive which mobile applications are displayed.

Figure 4:
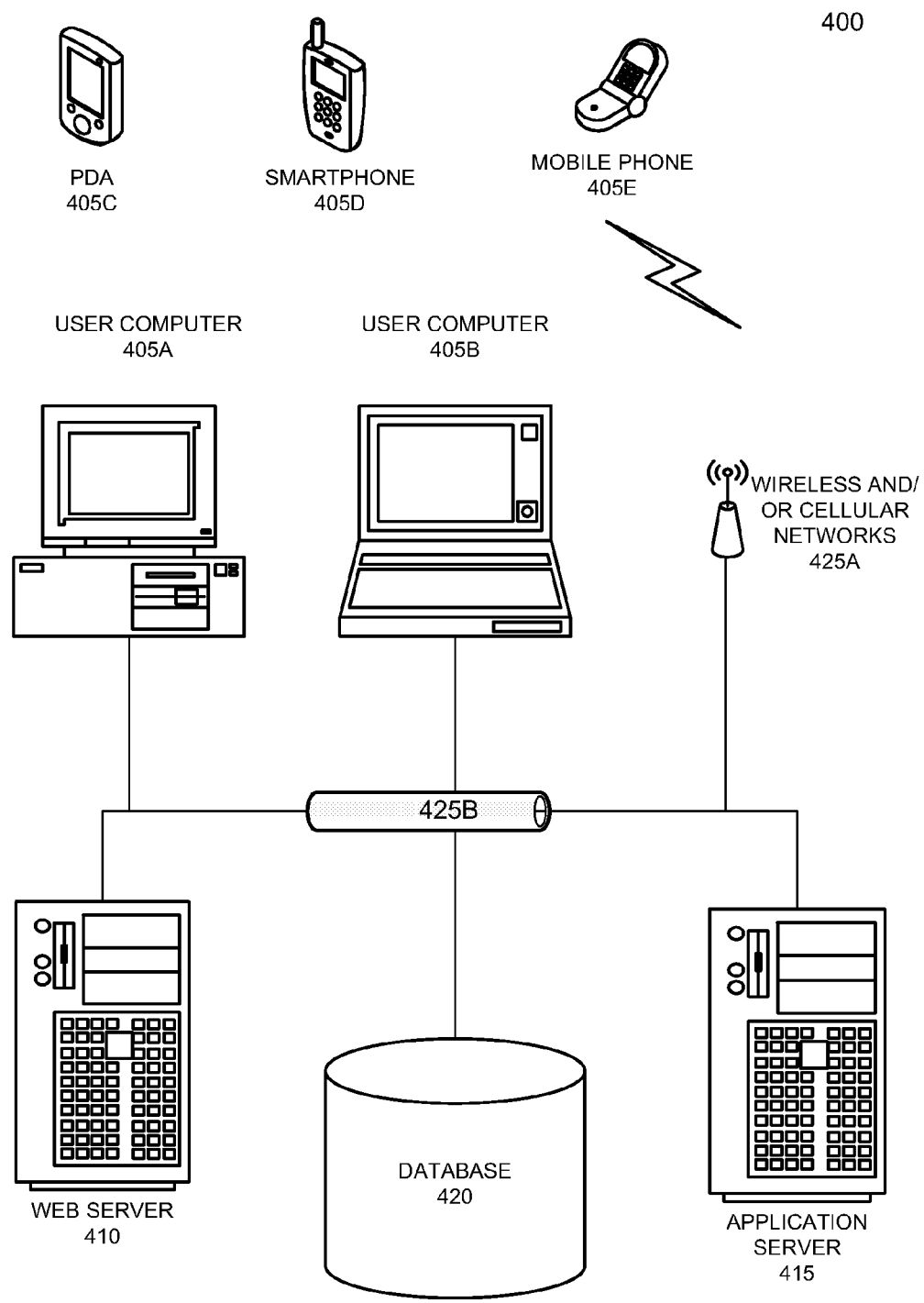
FIG. 4 shows an example computer and network system architecture suitable for implementing embodiments of the invention.

FIG. 4 shows an example computer and network system architecture 400 suitable for implementing embodiments of the invention. The system includes user computers 405 including portable 405A and desktop personal computers 405B, personal digital assistants 405C, smartphones 405D, and mobile phones 405E. The system can interface with any type of electronic device, such as a thin-client computer, Internet-enabled mobile telephone, mobile Internet access device, tablet, electronic book, or personal digital assistant, capable of displaying and navigating web pages or other types of electronic documents. Although the system is shown with five user computers, any number of user computers can be supported.

A web server 410 is used to process requests from web browsers and standalone applications for web pages, electronic documents, enterprise data or other content, and other data from the user computers. The server 410 may also provide the menu application, as well as syndicated content, such as RSS or Atom feeds, of data related to enterprise operations.

Application server 415 operates one or more mobile applications. The mobile applications can be implemented as one or more scripts or programs written in any programming language, such as Java, C, C++, C#, or any scripting language, such as JavaScript or ECMAScript, Perl, PHP, Python, Ruby, or TCL. Data applications can be built using libraries or application frameworks, such as Rails, Enterprise JavaBeans, or .NET.

The data applications on application server 415 process input data and user computer requests and can store or retrieve data from database 420. Database 420 stores data created and used by the data applications. In an embodiment, the database 420 is a relational database, such as MySQL, that is adapted to store, update, and retrieve data in response to SQL format commands. In other embodiments, unstructured data storage architectures and NoSQL databases may also be used.

In an embodiment, the application server 415 is one or more general-purpose computers capable of executing programs or scripts. In an embodiment, the web server 410 is implemented as an application running on one or more general-purpose computers. The web server and application server may be combined and executed on the same computers.

An electronic communication network 425 enables communication between user computers 405, web server 410, application server 415, and database 420. In an embodiment, network 425 may further include any form of electrical or optical communication devices, including wireless 425A and wired 425B networks. Network 425 may also incorporate one or more local-area networks, such as an Ethernet network; wide-area networks, such as the Internet and cellular carrier data networks; and virtual networks, such as a virtual private network.

The system is one example for executing mobile applications according to an embodiment of the invention. In another embodiment, application server, web server, and optionally database can be combined into a single server computer application and system. In a further embodiment, virtualization and virtual machine applications may be used to implement one or more of the application server, web server, and database. In still further embodiments, all or a portion of the web server and application functions may be integrated into an application running on each of the user computers. For example, a JavaScript application on the user computer may be used to retrieve or analyze data and display portions of the applications.

Although the description has been described with respect to particular embodiments thereof, these particular embodiments are merely illustrative, and not restrictive.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for generating an interface on a mobile device, the method comprising:
   obtaining a list of mobile applications, the mobile applications being located on an application server;
   selecting one of the mobile applications on the list of mobile applications;
   accessing a servlet associated with the selected mobile application to request menu data associated with the selected mobile application;
   obtaining the menu data of the selected mobile application from the servlet, wherein the menu data includes design-time configuration information pertaining to a design-time version of a menu item and run-time configuration information pertaining to a run-time version of the menu item;
   determining the configuration of the menu item at run-time by combining the design-time configuration information and the run-time configuration information, wherein determining the configuration of the menu item at run-time comprises modifying the configuration of the menu item in response to the run-time information taking precedence over the design-time information;
   generating the menu item;
   adding the menu item to a menu list; and
   sending the menu list to the device to generate at least a portion of a display.

2. The method of claim 1, wherein the servlet is adapted to query the selected mobile application for menu data.

3. The method of claim 1, comprising:
   providing the menu list for presentation to a user.

4. The method of claim 3, wherein each of the mobile applications is able to be launched using a unique URL, the method comprising:
   receiving an indicator of user input in response to an activation of the menu item included in the menu list by a user; and
   launching the mobile application associated with the activated menu item by accessing the unique URL to the application server.

5. The method of claim 3, wherein providing the menu list for presentation to a user comprises:
   encoding the menu list as a web page; and
   providing the web page to a web server, the web server being accessible from the device through a menu URL.

6. The method of claim 1, wherein one or more steps are repeated for multiple mobile applications.

7. The method of claim 1, wherein the servlet associated with the selected mobile application is an instantiation of a servlet class shared among at least two of the mobile applications.

8. The method of claim 7, wherein sharing is achieved by using a shared library comprising the servlet class.

9. The method of claim 7, the instantiation being characterized and accessible through a file in XML format.

10. The method of claim 1, wherein the menu data further comprises one or more icons.

11. The method of claim 1, wherein the menu data further comprises a name of the mobile application.

12. The method of claim 11, wherein the name of the mobile application is translated.

13. The method of claim 1, wherein the menu data further comprises one or more descriptive strings of the mobile application.

14. The method of claim 13, wherein one or more of the descriptive strings are translated.

15. The method of claim 1, wherein the menu data further comprises another aspect of audiovisual design of menu interfaces, the aspect selected from the group consisting of animations, tooltips, layout, color, shape, and audio.

16. The method of claim 1, wherein obtaining a list of mobile applications further comprises:
   authenticating a user of the device at a start of a session;
   determining an authorization level of the user;
   based on the authorization level of the user, adding at least a first mobile application to a list of mobile applications; and
   based on the authorization level of the user, excluding at least a second mobile application from the list of mobile applications.

17. A non-transitory computer-readable media, including instructions adapted to direct a computer to perform an operation, the operation comprising:

obtaining a list of mobile applications, the mobile applications being located on an application server;

selecting one of the mobile applications on the list of mobile applications;

accessing a servlet associated with the selected mobile application to request menu data associated with the selected mobile application;

obtaining menu data of the selected mobile application from the servlet, wherein the menu data includes design-time configuration information pertaining to a design-time version of a menu item and run-time configuration information pertaining to a run-time version of the menu item;

determining the configuration of the menu item at run-time by combining the design-time configuration information and the run-time configuration information, wherein determining the configuration of the menu item at run-time comprises modifying the configuration of the menu item in response to the run-time information taking precedence over the design-time information;

generating the menu item; and adding the menu item to a menu list.

18. A method for generating an interface on a mobile device, the method comprising:

accessing a servlet associated with t-he a selected mobile application to request menu data associated with the selected mobile application;

obtaining menu data of the selected mobile application from the servlet, wherein the menu data includes design-time configuration information pertaining to a design-time version of a menu item and run-time configuration information pertaining to a run-time version of the menu item;

determining the configuration of the menu item at run-time by combining the design-time configuration information and the run-time configuration information, wherein determining the configuration of the menu item at run-time comprises modifying the configuration of the menu item in response to the run-time information taking precedence over the design-time information;

generating the menu item;

adding the menu item to a menu list; and sending the menu list to the device to generate at least a portion of a display.

\* \* \* \* \*